United States Patent [19]

Banda et al.

[11] Patent Number: 4,624,582
[45] Date of Patent: Nov. 25, 1986

[54] MULTI-WIRE MINERAL INSULATED CABLE THERMOCOUPLE REFERENCE JUNCTION

[76] Inventors: Lionel A. Banda, 43 Oakwood Dr., South Windsor, Conn. 06074; Thomas J. Devon, 27 Pinney Rd., Bloomfield, Conn. 06002

[21] Appl. No.: 584,840
[22] Filed: Feb. 29, 1984
[51] Int. Cl.⁴ .......................... G01K 7/02; G01K 7/10
[52] U.S. Cl. ...................... 374/181; 165/185; 174/35 R; 374/112; 374/172
[58] Field of Search ............ 374/181, 179, 137, 171, 374/112, 115, 208, 182, 165, 172, 169; 174/35 C, 71 R, 11 R

[56] References Cited
U.S. PATENT DOCUMENTS

| 1,968,534 | 7/1934 | Megow | 374/111 |
| 2,291,051 | 7/1942 | Mascuch | 174/35 C |
| 3,069,909 | 12/1962 | Hines | 374/208 |
| 3,192,770 | 7/1965 | Bash | 374/110 |
| 3,281,518 | 10/1966 | Stroud et al. | 374/165 |
| 3,312,777 | 4/1967 | Lovett, Jr. et al. | 174/71 R |
| 3,439,111 | 4/1969 | Miracle et al. | 174/36 X |
| 3,576,939 | 5/1969 | Ziemek | 174/36 X |
| 3,588,776 | 6/1971 | Horwinski | 374/110 X |
| 3,648,523 | 3/1972 | Kemper et al. | 374/182 |
| 3,891,791 | 6/1975 | Schmidt | 174/36 X |
| 4,147,061 | 4/1979 | Wester et al. | 374/171 X |
| 4,186,605 | 2/1980 | Bourigault | 374/115 |
| 4,265,117 | 5/1981 | Thoma et al. | 374/165 X |
| 4,375,009 | 2/1983 | Fearnside et al. | 174/35 R X |
| 4,384,793 | 5/1983 | O'Brien | 374/115 |
| 4,441,071 | 4/1984 | Houseman | 374/181 |

Primary Examiner—Daniel N. Yasich
Attorney, Agent, or Firm—David L. Smith

[57] ABSTRACT

Apparatus for making a transition from leads (12–26) of a temperature measuring thermocouple to extension wires (44–58) within a hermetically sealed cable sheath (60) of small diameter. The interior of the cable sheath (60) is shielded from electromagnetic radiation by an electrically conductive liner (62). A thermally conductive, electrically insulating material (66) surrounds the intermediate junctions (28–42). The temperature of the intermediate junctions (28–42) is measured (64) providing a signal to compensate the voltage generated by the temperature measuring thermocouples due to the thermoelectric effect of the intermediate junctions (28–42).

29 Claims, 9 Drawing Figures

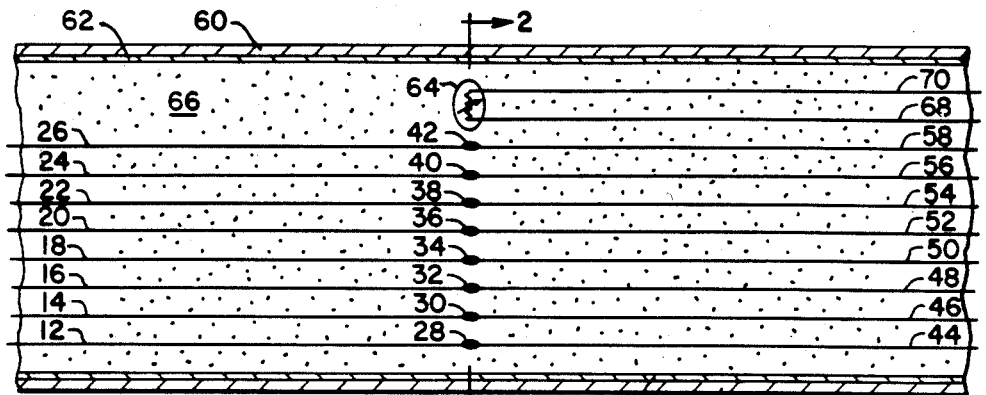
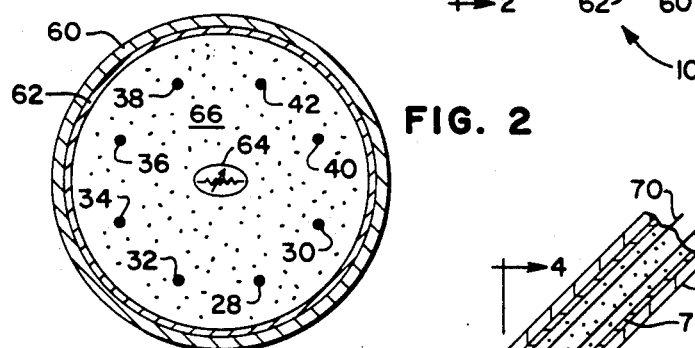
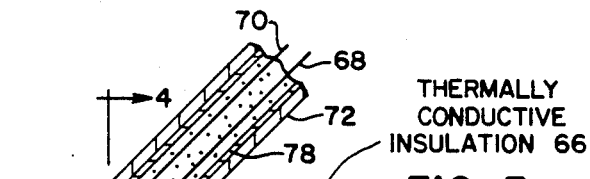
THERMALLY CONDUCTIVE INSULATION 66
FIG. 3
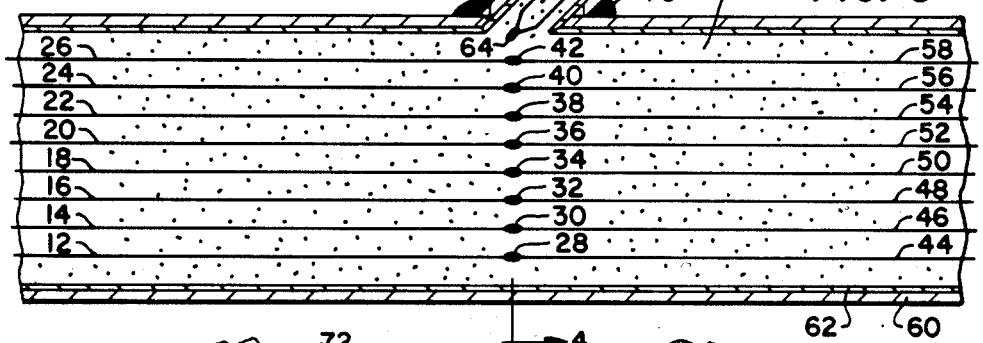
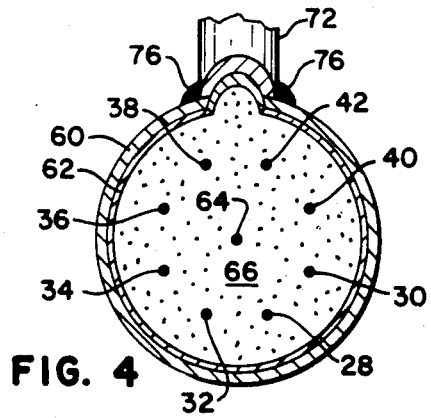
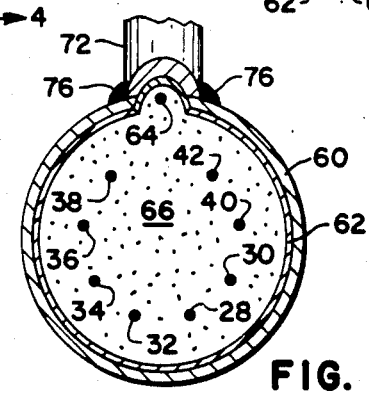

MULTI-WIRE MINERAL INSULATED CABLE THERMOCOUPLE REFERENCE JUNCTION

BACKGROUND OF THE INVENTION

The present invention relates to the transition between thermocouple leads and extension wires, and in particular to making the transition between thermocouple material leads and extension wire inside of a multi-conductor mineral insulated cable so that the transition can be made in a controlled manner, environmentally protected as close as possible to the thermocouple so that the length of the thermocouple material leads is minimal.

A thermocouple generates a voltage proportional to the junction temperature. In many applications, such as measuring a temperature distribution inside of a reactor vessel, the voltage measuring instrumentation is located outside of the reactor containment building, perhaps several hundred feet from the temperature measuring thermocouple. One known method to provide the voltage generated by a thermocouple to the processing instrumentation is to connect the thermocouple leads directly to the processing instrumentation with long runs of thermocouple leads therebetween. The thermocouple leads are made of particular, expensive alloys depending upon the type of thermocouple used. It is, therefore, commercially desirable to make a transition from thermocouple leads to a lesser expensive conductor, such as copper wire, as close to the temperature measuring thermocouple as practical.

One known technique for making the transition from thermocouple leads to a lesser expensive conductor includes terminating the leads of several temperature measuring thermocouples in a junction box within the reactor containment building with copper extension wires conducting the thermocouple generated voltage to the processing instrumentation outside the reactor containment building. The temperature inside the junction box is measured by another temperature measuring device so that the thermocouple generated voltage as measured by the processing instrumentation may be compensated for the voltage introduced at the intermediate junctions within the junction box. This technique requires thermocouple leads of substantial length be run from the temperature measuring thermocouples to a location within the containment building where it is convenient to locate a junction box. Furthermore, a temperature gradient may exist within the junction box such that all of the intermediate junctions within the junction box are not at the measured temperature of the junction box. Thus, an error is introduced in the measured temperatures due to a temperature gradient at the intermediate junctions within the junction box.

Therefore, it is an object of this invention to provide apparatus which is capable of making the transition from leads of a temperature measuring thermocouple to extension wires closer to the temperature measuring thermocouple than is practical using a junction box.

It is a further object of this invention to make the transition from leads of a temperature measuring thermocouple to extension wires in an environmentally protected and miniaturized manner which maximizes measurement accuracy by eliminating temperature gradients.

SUMMARY OF THE INVENTION

The present invention provides apparatus for making a transition from leads of a temperature measuring thermocouple to extension wires as close to the temperature measuring thermocouple as practical. In accordance with the present invention, a transition from leads of a temperature measuring thermocouple to extension wires is made within a hermetically sealed cable sheath of small diameter. The interior of the cable sheath is shielded from electromagnetic radiation by an electrically conductive liner located within the sealed cable sheath. Intermediate junctions between thermocouple leads and extension wires are formed within the cable sheath. A thermally conductive, electrically insulating material surrounds the intermediate junctions. The temperature of the intermediate junctions is measured providing a signal to compensate the voltage generated by the temperature measuring thermocouples due to the thermoelectric effect of the intermediate junctions.

BRIEF DESCRIPTION OF THE DRAWINGS

FIG. 1 is a cross-sectional view of a cable, partially schematic, along the length of the cable in the region of intermediate junctions, in accordance with the present invention;

FIG. 2 is a cross-sectional view of the cable of FIG. 1 perpendicular to the length of the cable taken along the line 2—2;

FIG. 3 is a cross-sectional view, partially schematic, of an alternate embodiment of the invention;

FIG. 4 is a cross-sectional view of the cable of FIG. 3 perpendicular to the length of the cable taken along line 4—4 in FIG. 3;

FIG. 5 is a cross-sectional view of the cable of FIG. 3 perpendicular to the length of the cable taken along line 4—4 in FIG. 3 with the compensating temperature measuring element shown in the second cable;

DESCRIPTION OF THE PREFERRED EMBODIMENT

Figure 6:
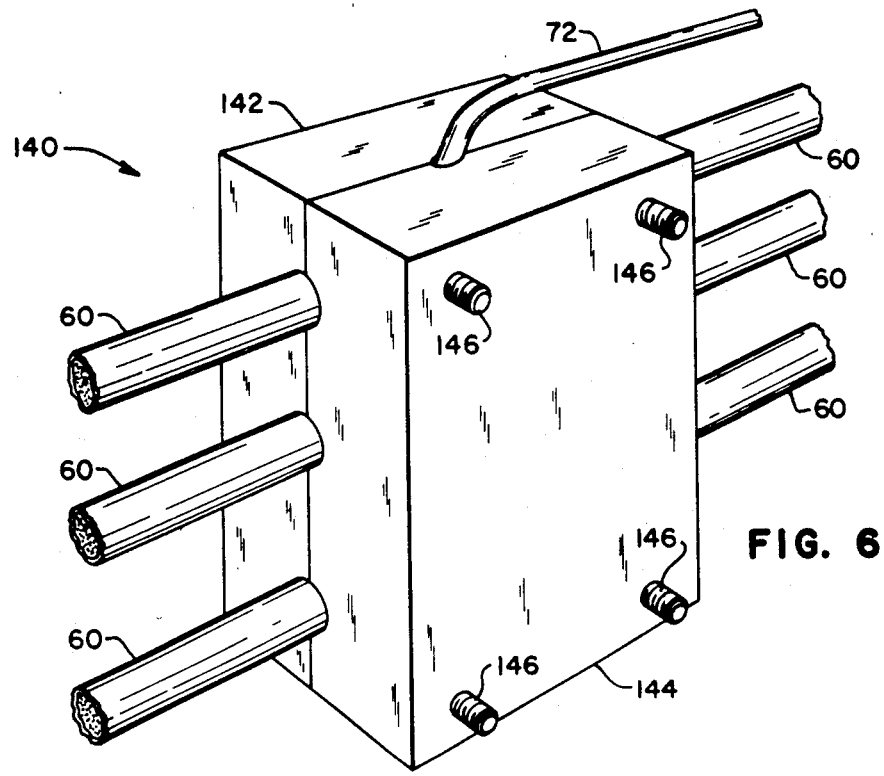
FIG. 6 is a side elevation view showing the cable of FIGS. 1 and 2 in the region of the transition mounted in a mounting block.

Referring to the drawing, initially to FIG. 1, there is depicted therein apparatus 10 for making a transition within a cable from leads of a temperature measuring thermocouple to extension wires in accordance with the present invention. In FIG. 1, temperature measuring thermocouple leads 12-26 form intermediate junctions 28-42 where leads 12-26 juncture with extension wires 44-58, respectively. Leads 12-26, in pairs, form temperature measuring thermocouples (not shown). For example, lead 12 made of a first alloy joins with lead 14 of a second alloy to form a temperature measuring thermocouple. Extension wires 44 and 46, conduct the voltage generated by the temperature measuring thermocouple across leads 12 to 14 from intermediate junctions 28 and 30 to the processing instrumentation (not shown) such as a heated junction thermocouple processor, part number D-00000-422-081 manufactured by Combustion Engineering. Similarly, leads 16 and 18, leads 20 and 22, as well as leads 24 and 26 form temperature measuring thermocouples with extension wires 48 and 50, 52 and 54, and 56 and 58 conducting the thermocouple generated voltage back to the processing instrumentation. Leads 12-26, intermediate junctions 28-42 and extension wires 44-58 are enclosed in hermetically sealed cable sheath 60. Cable sheath 60 may be made of any suitable metal or material that provides an environmentally immune sheathing. Typically, cable sheath 60 is a stainless steel cable sheath 15 mils thick with a 0.6 centimeter inside diameter. Liner 62 forms a low resistance, electrically conductive path to ground coaxially with and along the inner surface of sheath 60. Typically, liner 62 is copper, 15 mils thick with an outside diameter less than the inside diameter of sheath 60. A compensating temperature measuring element 64, which may be another thermocouple, a resistance temperature detector or any other known temperature measuring element is disposed within sheath 60 and preferably within liner 62 in the region of intermediate junctions 28-42. Thermally conductive, electrically insulating insulation 66, typically inorganic insulation such as silicon dioxide, fills the sheath in the region of intermediate junctions 28-42. Insulation 66 being thermally conductive assures that all intermediate junctions 28-42 are at the temperature measured by compensating temperature measuring element 64 which may be but is not limited to a thermocouple or resistance temperature device.

As best seen in FIG. 2, compensating temperature measuring element 64 is located near intermediate junctions 28-42 such that compensating temperature measuring element 64 measures the temperature of intermediate junctions 28-42. The intermediate junctions 28-42 substantially form a circle such that compensating temperature measuring element 64, which is typically at the center, is not more than one inside diameter from any of intermediate junctions 28-42 and in the preferred embodiment is not more than one inside radius from any of intermediate junctions 28-42. Due to the thermal conductivity of insulation 66 and the compactness of intermediate junctions 28-42, no temperature gradient exists across intermediate junctions 28-42 and compensating temperature element 64 such that the temperature measured by compensating temperature element 64 is the temperature of intermediate junctions 28-42.

In the embodiment shown in FIG. 1, the leads 68 and 70 of compensating temperature measuring element 64 run along extension wires 44-68 within sheath 60 to the processing instrumentation. In accordance with known methods, the signal generated by compensating temperature measuring element 64 indicative of the temperature of the intermediate junctions 28-42 is available to the processing instrumentation to compensate the voltage signal indicative of the temperature measured by temperature measuring thermocouples across leads 12 and 14, 16 and 18, 20 and 22 as well as 24 and 26 with the voltage signal indicative of the temperature conducted to the processing electronics on extension wires 44 and 46, 48 and 50, 52 and 54 as well as 56 and 58, respectively. Thus, a transition is made within sheath 60 from an N conductor cable to an (N+2) conductor cable, where N is the number of thermocouple leads, typically an even number, and the quantity N+2 represents the number of conductors running within sheath 60 from intermediate junctions 28-42 back to the processing instrumentation. FIG. 1 shows a transition from an 8 conductor to a 10 conductor cable. The invention, however, is not limited to an 8 to 10 transition. The larger the value of N, the greater the economic savings.

In an alternate embodiment of the invention shown in FIG. 3 the leads of compensating temperature measuring element 64 that run back to the processing instrumentation pass through a second hermetically sealed cable sheath 72. Sheath 72, like sheath 60, is typically stainless steel, flexible and 15 mils thick, but sheath 72 has an internal diameter of about 0.3 centimeters (0.125 in.). Sheath 72 need only be large enough to accommodate two conductors. Sheath 72 is hermetically sealed with sheath 60 such as by brazing or welding; the preferred embodiment shows circumscribing weld 76. Sheath 72 is lined with a low resistance, electrically conductive liner 78, typically a copper liner 10 mils thick, which is electrically conductive with liner 62. Liner 78 shields the interior of sheath 72 from electromagnetic radiation. The embodiment of the present invention shown in FIG. 3 is particularly useful in measuring temperatures inside of the reactor containment building of a nuclear power station where compensating temperature measuring element 64 is a thermocouple. Thermocouple lead conductors penetrate the containment building in a penetration separate from copper conductors. Since the two penetrations are physically separated, having a hermetically sealed cable housing the thermocouple leads separate from copper extension wires facilitates running the respective cables to an appropriate containment building penetration.

FIG. 4 shows a cross-section of the cable of FIG. 3 disclosing an arrangement of intermediate junctions and compensating temperature measuring element 64 that form substantially a circle coaxially with the center of sheath 60. In this arrangement, like in the arrangement of intermediate junctions in FIG. 2, compensating temperature measuring element 64 is, in the preferred embodiment, not more than one inside radius of sheath 60 from any of intermediate junctions 28-42. Other arrangements of intermediate junctions 28-42 and compensating temperature measuring element 64 are possible; it is only critical that intermediate junctions 28-42 be at the same temperature and that temperature be measured by compensating temperature measuring element 64.

FIG. 5 shows a variation of the cable cross-section wherein compensating temperature measuring element 64 is disposed within second sheath 72. In locating compensating temperature measuring element 64, it is critical only that temperature measuring element 64 measure the temperature of intermediate junctions 28-42 and that no temperature gradient exist across intermediate junctions 28-42.

The temperature measured by compensating temperature element 64 responds rapidly to temperature variations surrounding the cable sheath due to the compactness of the transition and the thermal conductivity of the insulation as well as the sheath; albeit, a small time delay in heating or cooling the cable is introduced. In some applications a rapid thermal response is desirable. In other applications where thermal transients are superimposed on a slower temperature increase or decrease of the environment surrounding the cable sheath in the region of the transition, it is desirable to dampen the transient thermal response. A thermal dampening mass 140 is shown in FIG. 6 surrounding and in heat exchange relation with cable sheaths 60 and 72 in the region of intermediate junctions 28-42 to achieve the thermal dampening. Mass 140, typically 25 centimeters by 25 centimeters by 10 centimeters (10 inches by 10 inches by 4 inches) of stainless steel, is formed of two portions 142 and 144 secured together by securing means 146. Mass 140 may surround one or more cable sheaths 60, 72 in the region of intermediate junctions 28–42. Mass 140 dampens the thermal transients of the environment surrounding the cable sheaths by providing a larger mass that must change temperature before the temperature of intermediate junctions 28-42 as measured by compensating temperature element 64 changes.

To accommodate a straight cable sheath 60 a semicircular groove is made in abutting surfaces of portions 142 and 144 of mass 140. To gain better thermal conductivity between cable sheath 60 and thermal mass 140 a thermally conductive material may be applied to the exterior surface of cable sheath 60.

To accommodate a "Y"ed cable including cable sheaths 60 and 72, a mold of the cable junctions may be made and the semicircular grooves in portions 142 and 144 machined to comform to the cable junction.

Figure 7:
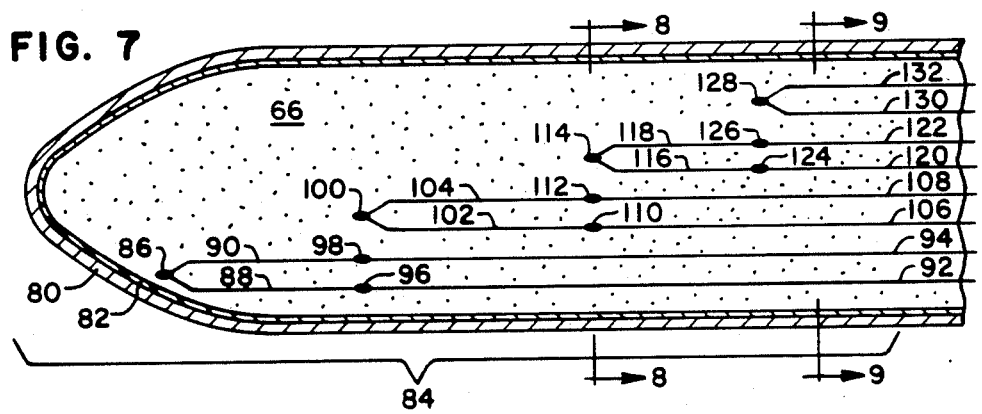
FIG. 7 is a cross-sectional view of a cable, partially schematic, of yet another alternate embodiment of the present invention.

Another alternate embodiment of the present invention with which a temperature gradient along a length of the cable can be measured is shown in FIG. 7. Cable sheath 80, a hermetically sealed sheath is closed on the active end. Cable sheath 80 may be made of any suitable metal or material that provides an environmentally immune sheathing. In the preferred embodiment, cable sheath 80 is made of a stainless steel. Sheath 80 is lined with a low resistance, electrically conductive liner means 82 for shielding the interior of liner 82 from electromagnetic radiation. The active length of sheath 80 is defined to be coextensive with the length through which a temperature gradient measurement is desired. The active length of the sheath 80 is divided by the number of thermocouples used to measure the temperature gradient such that the thermocouples are spaced at substantially equal distances along sheath 80 through the active region 84. It is not essential that the thermocouples be substantially equally spaced; application specific factors may necessitate a nonuniform spacing. FIG. 7 shows four thermocouples spaced substantially uniformly through active region 84 within sheath 80. Thermocouple 86 is placed near the closed end of sheath 80. Leads 88 and 90 of thermocouple 86 extend away from the closed end of sheath 80 and make a transition to extension wires 92 and 94, respectively, at intermediate junctions 96 and 98, respectively. Thermocouple 100 is located in the region of intermediate junctions 96 and 98 and functions both as a reference junction relative to the adjacent intermediate junctions 96 and 98 and simultaneously as a measure of temperature along active region 84. Leads 102 and 104 of thermocouple 100 extend away from the closed end of sheath 80 and juncture with extension wires 106 and 108, respectively, forming intermediate junctions 110 and 112, respectively.

Similarly, thermocouple 114 is located in the region of intermediate junctions 110 and 112 to function both as a reference junction relative to the adjacent intermediate junctions and simultaneously as a measure of the temperature along active region 84. Thermocouple leads 116 and 118 of thermocouple 114 extend away from the closed end of sheath 80 and juncture with extension wires 120 and 122, respectively, forming intermediate junctions 124 and 126. Thermocouple 128 is located in the region of intermediate junctions 124 and 126 and functions as a reference junction relative to the adjacent intermediate junctions and simultaneously as a measure of the temperature along active region 84. Leads 130 and 132 of thermocouple 128 as well as extension wires 92, 94, 106, 108, 120 and 122 run along the length of sheath 80 away from the closed end back to processing instrumentation (not shown).

The processing instrumentation uses the voltage generated by thermocouple 100 to compensate the voltage generated by thermocouple 86 for the thermoelectric effect at intermediate junctions 96 and 98 due to the temperature difference between the physical locations of intermediate junctions 96 as well as 98 and thermocouple 86. Similarly, the voltage generated by thermocouple 100 is compensated by the voltage generated by thermocouple 114 for the thermoelectric effect at intermediate junctions 110 and 112 due to the temperature difference between the physical locations of intermediate junctions 110 as well as 112 and thermocouple 100. Similarly, the voltage generated by thermocouple 114 is compensated by the voltage generated by thermocouple 128 for the thermoelectric effect at intermediate junctions 124 and 126 due to the temperature difference between the physical locations of intermediate junctions 124 as well as 126 and thermocouple 114.

Figure 8:
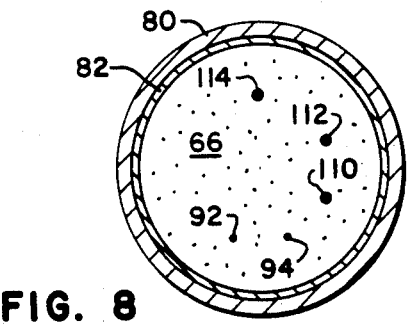
FIG. 8 is a cross-sectional view of the cable of FIG. 7 taken along the lines 8—8.
Figure 9:
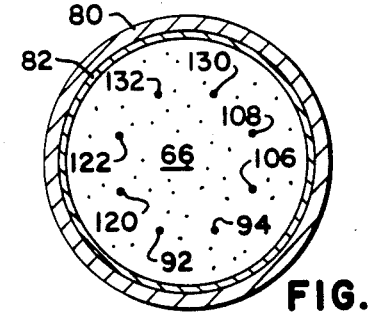
FIG. 9 is a cross-sectional view of the cable of FIG. 7 taken along the line 9—9.

FIGS. 8 and 9 are cross-sectional views of cable sheath 80 in active region 84. Both of the figures show the conductors equally spaced around an imaginary circle coaxially with the center of sheath 80 and within liner 82. It is not essential that the conductors be equally spaced. The spacing used is maintained by a thermally conductive, electrically insulating material 66 at least in the region of the thermocouples and intermediate junctions.

A minimum of two thermocouples are required to measure a temperature gradient. More than two thermocouples may be used depending upon the length of active region 84 and the resolution within the active region desired.

What is claimed is:

1. Cable means for making a transition from leads of a temperature measuring means to extension wires that conduct a signal indicative of the temperature measured by the temperature measuring means to signal processing electronics, comprising:
    (a) a cable sheath;
    (b) a low resistance, electrically conductive liner means disposed coaxially within the sheath for defining a shielded region within the interior of the liner means and for shielding the interior region from electromagnetic radiation;
    (c) a pair of leads extending from a temperature measuring means to within the shielded region within the interior of the liner means;
    (d) a pair of extension wires extending from within the shielded region within the interior of the liner means to signal processing electronics;
    (e) a plurality of intermediate junctions disposed in the shielded region and formed at the juncture of the leads of the temperature measuring means and the extension wires;
    (f) thermally conductive, electrically insulating means for filling the shielded region at least through the region of the intermediate junctions and for conducting thermal energy from the conductive liner means throughout the thermally conductive, electrically insulating means in the region of the intermediate junctions such that no temperature gradient exists across the radius of the liner means; and (g) a compensating temperature measuring means having leads, the compensating temperature measuring means disposed within the sheath in the region of the intermediate junctions for measuring the temperature of the intermediate junctions and for generating a signal indicative of the temperature of the intermediate junctions, said signal impressed on the leads thereof, whereby the signal indicative of the temperature of the intermediate junctions generated by the compensating temperature means is available to compensate a signal indicative of the temperature measured by the temperature measuring means as conducted on the extension wires due to the thermoelectric effect of the intermediate junctions.

2. Apparatus for making a transition within a cable from leads of a temperature measuring means to extension wires as recited in claim 1 wherein the cable sheath comprises a hermetically sealed cable sheath.

3. Apparatus for making a transition within a cable from leads of a temperature measuring means to extension wires as recited in claim 1 wherein the compensating temperature measuring means is disposed within the shielded region.

4. Apparatus for making a transition within a cable from leads of a temperature measuring means to extension wires as recited in claim 1 further comprising a thermal dampening means surrounding the cable sheath in the region of the transition for dampening the effects of thermal transients.

5. Apparatus for making a transition within a cable from leads of a temperature measuring means to extension wires as recited in claim 1 wherein the leads of the compensating temperature measuring means are disposed within the cable sheath.

6. Apparatus for making a transition within a cable from leads of a temperature measuring means to extension wires as recited in claim 1 wherein the compensating temperature means is comprised of a thermocouple.

7. Apparatus for making a transition within a cable from leads of a temperature measuring means to extension wires as recited in claim 1 wherein the compensating temperature means is comprised of a resistance temperature detector.

8. Apparatus for making a transition within a cable from leads of a temperature measuring means to extension wires as recited in claim 1 wherein the low resistance, electrically conductive liner means is comprised of a copper containing liner.

9. Apparatus for making a transition within a cable from leads of a temperature measuring means to extension wires as recited in claim 1 wherein the sheath is comprised of a stainless steel containing sheath.

10. Apparatus for making a transition within a cable from leads of a temperature measuring means to extension wires as recited in claim 1 wherein the thermally conductive, electrically insulating means is comprised of an inorganic insulation.

11. Apparatus for making a transition within a cable from leads of a temperature measuring means to extension wires as recited in claim 1 wherein the thermally conductive, electrically insulating means is comprised of a silicon dioxide.

12. Cable means for making a transition from leads of a temperature measuring thermocouple to extension wires that conduct a signal indicative of the temperature measured by the temperature measuring thermocouple to signal processing electronics, the transition being as close to the temperature measuring thermocouple as practical, comprising:

(a) a first cable sheath;

(b) a low resistance, electrically conductive liner means disposed coaxially within the sheath for defining a shielded region within the interior of the liner means and for shielding the interior region from electromagnetic radiation;

(c) a pair of leads extending from a temperature measuring thermocouple to within the shielded region within the interior of the liner means;

(d) a pair of extension wires extending from within the shielded region within the interior of the liner means to signal processing electronics;

(e) a plurality of intermediate junctions disposed in the shielded region and formed at the juncture of the temperature measuring thermocouple leads and the extension wires;

(f) thermally conductive, electrically insulating means for filling the shielded region at least through the region of the intermediate junctions and for conducting thermal energy;

(g) a compensating temperature measuring means disposed in the region of the intermediate junctions and having leads extending therefrom away from the region of the intermediate junctions to signal processing electronics;

(h) a second cable sheath, the interior of the second cable sheath in communication with the interior of the first cable sheath in the region of the intermediate junctions, the second sheath branching from the first sheath to house the leads of the compensating temperature measuring means; and (i) a low resistance, electrically conductive liner means within the second cable sheath, the liner means within the second cable sheath electrically conductive with the liner means within the first cable sheath, for defining a shielded region within the interior of the liner means within the second cable sheath and for shielding the interior region within the second sheath from electromagnetic radiation.

13. Apparatus for making a transition within a cable from leads of a temperature measuring means to extension wires as recited in claim 12 wherein the leads of the compensating temperature measuring means are disposed within the second cable sheath.

14. Apparatus for making a transition within a cable from leads of a temperature measuring means to extension wires as recited in claim 12 wherein the compensating temperature measuring means is disposed within the first cable sheath.

15. Apparatus for making a transition within a cable from leads of a temperature measuring means to extension wires as recited in claim 12 wherein the compensating temperature measuring means is disposed within the second cable sheath.

16. Apparatus for making a transition within a cable from leads of a temperature measuring means to extension wires as recited in claim 12 wherein the low resistance, electrically conductive liner within the second sheath is comprised of copper.

17. Apparatus for making a transition within a cable from leads of a temperature measuring means to extension wires as recited in claim 12 wherein the second cable sheath is comprised of stainless steel.

18. Apparatus for making a transition within a cable from leads of a temperature measuring means to extension wires as recited in claim 12 further comprising a thermal dampening means surrounding at least the first cable sheath in the region of the transition for dampening the effects of thermal transients.

19. Apparatus for making a transition within a cable from leads of a temperature measuring means to extension wires as recited in claim 12 wherein the second cable sheath is sealed to the first cable sheath at the juncture thereof.

20. Apparatus for making a transition within a cable from leads of a temperature measuring means to extension wires as recited in claim 19 wherein the seal between the first cable sheath and the second cable sheath is a weld seam circumscribing the second cable sheath at the juncture.

21. Apparatus for making a transition within a cable from leads of a temperature measuring means to extension wires as recited in claim 19 wherein the seal between the first cable sheath and the second cable sheath is a braze seam circumscribing the second cable sheath at the juncture.

22. Apparatus for making a transition within a cable from leads of a temperature measuring means to extension wires as recited in claim 12 wherein the combination of the thermal conductivity of the thermally conductive, electrically insulating means and the radius of the liner means is such that no temperature gradient exists across the radius of the liner means in the region of the intermediate junctions.

23. Apparatus for measuring a temperature gradient, comprising:
   (a) a cable sheath closed at one end having an active length adjacent the closed end for measuring a temperature gradient;
   (b) a low resistance, electrically conductive liner means within the sheath for defining a shielded region within the interior of the liner means and for shielding the shielded region from electromagnetic radiation;
   (c) means for measuring temperature, disposed within the sheath adjacent the closed end and having leads extending therefrom away from the closed end of the sheath within the sheath;
   (d) extension wires disposed within the cable sheath joining with the leads of the temperature measuring means forming the intermediate junctions within the active length of the cable sheath;
   (e) a compensating temperature measuring means having leads extending therefrom away from the closed end of the cable sheath, the compensating temperature measuring means disposed within the cable sheath in the region of at least one of the intermediate junctions for measuring the temperature of the intermediate junction; and
   (f) thermally conductive, electrically insulating means for filling the shielded region at least in the region of the temperature measuring means and the compensating temperature measuring means, and for conducting thermal energy from the conductive liner means throughout the thermally conductive, electrically insulating means in the region of the temperature measuring means and the compensating temperature measuring means such that no temperature gradient exists across the radius of the liner means, whereby the temperature of at least two points along the active length of the cable sheath are measured with the temperature of one of the points being simultaneously the temperature along the active length of the cable sheath and the temperature of an intermediate junction.

24. Apparatus for measuring a temperature gradient as recited in claim 23 wherein the compensating temperature measuring means comprised of a resistance temperature detector.

25. Apparatus for measuring a temperature gradient as recited in claim 23 wherein the low resistance, electrically conductive liner means is comprised of copper.

26. Apparatus for measuring a temperature gradient as recited in claim 23 wherein the cable sheath is comprised of stainless steel.

27. Apparatus for measuring a temperature gradient as recited in claim 23 wherein the thermally conductive, electrically insulating means is comprised of an inorganic insulation.

28. Apparatus for measuring a temperature gradient as recited in claim 23 wherein the thermally conductive, electrically insulating means is comprised of silicon dioxide.

29. Apparatus for measuring a temperature gradient as recited in claim 23 wherein the compensating temperature measuring means is comprised of a thermocouple.

* * * * *